(12) United States Patent
Schonwald et al.

(10) Patent No.: US 10,904,253 B2
(45) Date of Patent: Jan. 26, 2021

(54) TECHNIQUES FOR PROVIDING FULL-FEATURED BROWSER ACCESS DURING CAPTIVE PORTAL AUTHENTICATION ROUTINES

(71) Applicant: Single Digits, Inc., Bedford, NH (US)

(72) Inventors: Neil Schonwald, Barrington, NH (US); Sarah Dempsey, Nashua, NH (US); Bob Sullivan, Peterborough, NH (US)

(73) Assignee: SINGLE DIGITS, INC., Bedford, NH (US)

( * ) Notice: Subject to any disclaimer, the term of this patent is extended or adjusted under 35 U.S.C. 154(b) by 319 days.

(21) Appl. No.: 15/959,947

(22) Filed: Apr. 23, 2018

(65) Prior Publication Data

US 2018/0309757 A1 Oct. 25, 2018

Related U.S. Application Data

(60) Provisional application No. 62/489,395, filed on Apr. 24, 2017.

(51) Int. Cl.
*H04L 29/06* (2006.01)
*H04W 12/06* (2009.01)

(52) U.S. Cl.
CPC ...... *H04L 63/0884* (2013.01); *H04L 63/0815* (2013.01); *H04L 63/0892* (2013.01); *H04W 12/0602* (2019.01); *H04W 12/0609* (2019.01)

(58) Field of Classification Search
CPC ............. H04L 63/0884; H04L 63/0815; H04L 63/0892; H04W 12/06
See application file for complete search history.

(56) References Cited

U.S. PATENT DOCUMENTS

| 2012/0209934 A1* | 8/2012 | Smedman | ........... H04L 12/5692 709/208 |
| 2015/0012970 A1* | 1/2015 | Toksvig | .............. H04L 63/0815 726/3 |
| 2015/0067782 A1* | 3/2015 | Choi | ....................... H04L 63/10 726/3 |
| 2015/0081382 A1* | 3/2015 | L'Heureux | ........ G06Q 30/0281 705/7.29 |

* cited by examiner

*Primary Examiner* — Ashokkumar B Patel
*Assistant Examiner* — William B Jones
(74) *Attorney, Agent, or Firm* — Grossman, Tucker, Perreault & Pfleger, PLLC

(57) ABSTRACT

The present disclosure is generally directed to a method and system for authentication with a computer network that comports with CNA requirements, but utilizes a bypass approach that allows for authentication to be completed within a full-featured browser. In an embodiment, an access point (AP) may be configured to allow for user devices to associate and detect the presence of a captive portal. However, during the CNA messaging sequence, the AP can provide a CNA bypass message that causes the CNA browser instantiated on the user device to consider the authentication complete without having to satisfy authentication requirements. Based on the CNA bypass message, the user device may then transition to a full-featured browser to complete authentication via a captive portal. Authentication may be completed by, for example, watching at least a portion of a video, playing a video game, taking a quiz, and/or entering identifying information.

14 Claims, 3 Drawing Sheets

TECHNIQUES FOR PROVIDING FULL-FEATURED BROWSER ACCESS DURING CAPTIVE PORTAL AUTHENTICATION ROUTINES

CROSS-REFERENCE TO RELATED APPLICATIONS

The present non-provisional application claims the benefit of U.S. Provisional Patent Application Ser. No. 62/489,395 filed on Apr. 24, 2017, the entire content of which is hereby incorporated by reference.

TECHNICAL FIELD

The present disclosure generally relates to network authentication, and more particularly, to techniques for providing full-featured browser access to user devices during network authentication routines that include a stage that utilizes a feature-constrained browser.

BACKGROUND

Smartphones and other mobile devices handle captive portal Wi-Fi networks, also known as "walled gardens," in a manner that makes end users aware that they need to take action before their session with an access point (AP) gets fully authenticated and thus allowed 'full' internet browsing. Some manufacturers build into their operating system OS a process that detects if the user associates with a Wi-Fi Service Set Identifier (SSID) but cannot connect to a known external URL. If that URL is unreachable (e.g., no 200 response) then the mobile device pops up a proprietary limited browser application that includes a relatively small set of features by design. In the case of iPhones, this is called the CNA ("Captive Network Assistant"). The CNA then displays the captive portal page that allows the user to input in any information they need to provide in order to 'Authenticate' and get online. Once the user satisfies the CNA input requirements, the CNA then displays a 'Done'/'Continue' button, or other navigation element, and once selected moves the user to a full browser. User experience is often encumbered by the limitations of the CNA as the associated browser has limited features and capabilities. For example, CNA browsers generally have no cookie handling capabilities, limited language capability (e.g., limited JavaScript), no tabs (single page only), no ability to adjust display window size, no session identifiers, and incapable of launching a full-featured browser from the CNA such as Safari.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
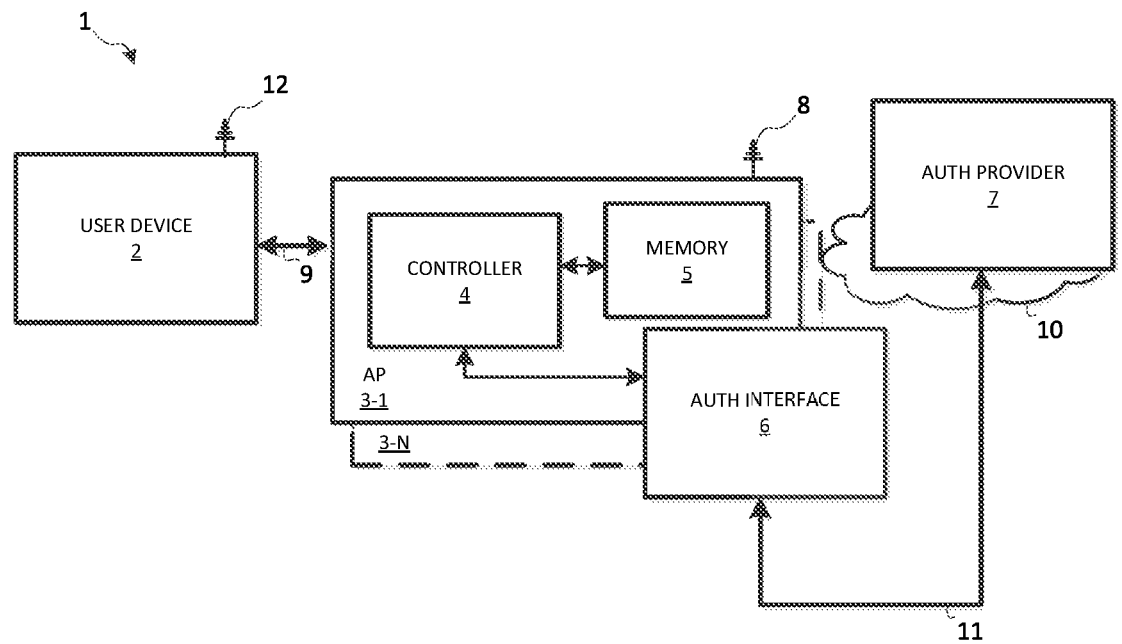
FIG. 1 shows an example network authentication system consistent with the present disclosure.

As discussed above, CNA-based implementations are widely utilized but leave much to be desired. Those who implement such schemes into their network authentication routines are limited in what content may be presented to a user during authentication, which unfortunately limits customization and innovations in the way in which users complete authentication requirements. For example, CNAs tend to follow the same execution flow that includes presenting a webpage/user interface with text boxes and other basic user interface elements to receive input, e.g., a username, password, telephone number, passcode, and so on, for authentication purposes. Once submitted (and acknowledged by an authentication provider), the CNA may then present a "CONTINUE" button or other navigation element that allows the user to browse the 'full' Internet or otherwise access content beyond a portal page.

Some approaches to keep authentication CNA-compatible but with additional features to present a full-featured browsing experience have been proposed. One such example approach includes utilizing a domain whitelisting scheme that identifies/detects CNA requests, e.g., to an external location, and permits those requests to pass-through as if the user device is authenticated. However, subsequent http requests to non-whitelisted uniform resource locators (URLs) fail and the user may be redirected to a URL that allows authentication to be fully completed. This approach therefore requires that each potential CNA gets whitelisted, which is impracticable given the number of mobile computing device manufacturers and changes over time to the URL which is utilized to confirm/activate CNA functionality. Moreover, a user must still perform all of the steps of the CNA to satisfy authentication requirements, as discussed above, as well as additional steps in the full-featured browser to complete authentication.

Thus, the present disclosure is generally directed to a method and system for authentication with a computer network that comports with CNA requirements, but with a bypass approach that allows for authentication to transition from a CNA browser to a full-featured browser without necessarily requiring user input via the CNA browser. In an embodiment, an access point (AP) may be configured to allow for user devices to associate and detect the presence of a captive portal. However, during the CNA messaging sequence, the AP may provide a CNA bypass message that causes the CNA browser instantiated on the user device to consider the authentication complete without having to satisfy authentication requirements, e.g., without having to provide a hotel room number, a cell phone number, or other information required to gain access to the computer network. The CNA bypass message may be substantially similar to the message an AP sends to a user device in response to the same satisfying the authentication requirements via the CNA browser. Based on the CNA bypass message, the user device may then transition from the CNA browser to a full-featured browser to complete authentication via the captive portal. Authentication may be completed by, for example, watching at least a portion of a video, playing a game, taking a quiz, and/or entering identifying information, e.g., a phone number, a hotel room number, a username and password.

Accordingly, an AP consistent with the present disclosure may be CNA-compliant and also allow for authentication requirements to be met/satisfied via a full-featured browser. This advantageously improves an authentication process for a computer network while maintaining backwards compatibility with existing CNA browsers/processes. For instance, an authentication process consistent with the present disclosure may provide improved graphical user interfaces (GUIs) through the full-featured browser that would be otherwise inaccessible to the feature-constrained CNA browser. In addition, the GUIs of the full-featured browser may utilize controls and content that users find intuitive to use relative to the basic user interface available in a CNA browser. The authentication process variously disclosed herein also minimizes or otherwise reduces the number of steps to perform using the CNA browser, thus abbreviating the user's experience with the CNA browser before transitioning to the full-featured browser to complete authentication.

Users who implement an AP consistent with the present disclosure may also have greater options for the types of authentication requirements that must be met. For example, users associating with an AP may be required to watch a video advertisement before being considered 'authenticated.' Therefore, aspects and embodiments of the present disclosure further improve authentication processes by allowing for additional revenue streams through a full-featured browser that enables such monetization.

The term CNA browser, as used herein, refers to any feature-constrained browser application utilized during captive network authentication routines. In contrast, the term full-featured browser refers to any browser application that does not artificially limit or disable features and is capable of, for example, multiple tabs, JavaScript compatibility, multi-media playback, cookies, session identifiers, and/or the ability to launch other instances of full-featured browsers.

While examples and scenarios provided herein refer to Wi-Fi networks, e.g., IEEE 802.1X networks, this disclosure is not limited in this regard. Aspects and embodiments disclosed herein are equally applicable to wired networks, or any other computer network in which authentication prior to providing 'full' access is desired. Locations such as hotels and convention centers may provide RJ-45 jacks for direct connection with a network that utilizes a captive portal, and such applications are envisioned by the present disclosure.

The terms access point (AP) and gateway may be used interchangeably herein. However, both AP and gateway functions may be provided by a single device or separately as one or more separate APs and associated gateways. Aspects and embodiments disclosed herein may be implemented in an AP, a gateway, or distributed over a number of AP and/or gateway devices. Moreover, some embodiments include providing logic/processes external to the AP/gateway devices, e.g., accessible via the Internet (e.g., the "cloud"), VPN. Thus, aspects and embodiments may be implemented whole, or in part, on remote computing devices that may be co-located, e.g., on the same local area network, with the APs/gateway or external, e.g., accessible via a wide area network (WAN).

Turning to the Figures, FIG. 1 shows an example embodiment of a network authentication system 1 consistent with an embodiment of the present disclosure. The network authentication system 1 is illustrated in a highly simplified form and is not intended to be limiting. As shown, the network authentication system 1 includes a user device 2, access point(s) (AP) 3-1 to 3-N, and an authentication provider 7.

The user device 2 may comprise, for example, a mobile computing device with an antenna device 12 and network interface circuit (not shown) for communicating wirelessly. Some examples of a mobile computing device include laptops, smart phones, tablet devices, wrist-worn devices (e.g., a smart watch), or any other device which can communicate with a network of computers. Note this disclosure is not necessarily limited to mobile computing devices and aspects and embodiments disclosed herein are equally applicable to other devices such as smart TVs or any other device that may be configured to communicate via a network. The user device 2 may be a propriety computing device with a mobile operating system (e.g., an Android or Apple iOS device). In other examples, the user device 2 may implement a Linux/Unix, Windows®, or Mac OS® operating system. Many other operating systems may be used, and examples are not limited to any particular operating system.

In any event, the user device 2 may be configured to communicate via wireless signals 9 by way of the antenna device 12. The wireless signals 9 may comport with an IEEE 802.1X standard, also known as Wi-Fi. However, other network protocols and standards are within the scope of this disclosure.

The authentication system 1 further includes one or more access points (APs) 3-1 to 3-N. The term AP and gateway may be used interchangeably herein although APs and gateways do not necessarily perform the same functions. Each AP 3-1 to 3-N may be configured substantially similar, or may be implemented with different configurations depending on a desired application. As shown, the AP 3-1 may be configured with an antenna device 8 and associated network interface circuit (not shown) to send and receive wireless signals 9. As further shown, the AP 3-1 includes a controller 4, a memory 5, and an authentication interface 6.

The controller 4 may be implemented as a processing device/circuit (not shown) such as, for example, a field-programmable gate array (FPGA), Reduced Instruction Set Computer (RISC) processor, x86 instruction set processor, microcontroller, an application-specific integrated circuit (ASIC). The controller 4 may be configured to execute a plurality of instructions to carry out processes in accordance with various aspects and embodiments disclosed herein. For example, the controller 4 may be configured to execute the authentication process of FIG. 2. The processes disclosed herein may be may be implemented, for example, using software (e.g., C or C++ executing on the controller/processor), hardware (e.g., hardcoded gate level logic or purpose-built silicon) or firmware (e.g., embedded routines executing on a microcontroller), or any combination thereof.

The memory 5 may comprise, for example, a non-volatile storage device including flash memory and/or volatile storage devices such as Random Access Memory (RAM), content addressable memory (CAM) device, Dynamic Random Access Memory (DRAM), and Static Ram (SRAM).

The APs 3-1 to 3-N may be utilized in combination with gateway devices, repeaters, and other associated network devices and the particular embodiment shown in FIG. 1 is not intended to be limiting. In some cases, example processes disclosed herein for network authentication may be performed at an AP, or may be performed whole or in part by other devices in communication with an AP such as a gateway.

The authentication interface 6 may be implemented in hardware, software, or any combination thereof. In some cases, the authentication interface 6 is implemented as a plurality of instructions that may be executed by the controller. In any event, the authentication interface 6 may be a process that monitors packets received via the antenna device 8. The authentication interface 6 may then perform a captive network authentication routine in response to a user device 2 associating with the AP 3-1, as discussed in further detail below.

The authentication provider 7 may have an application programming interface (API) accessible via the internet 10 (e.g., may be cloud-based) or other any other suitable network, e.g., a VPN tunnel, local area network, and so on.

The connection 11 may be wired or wireless. The authentication provider 7 may be configured with a database (not shown) that maintains a repository of active sessions and associated user device identifiers, e.g., a media access control (MAC) address, device name, IP address, operating system version, and/or device type. The database may further include an archive of previous (expired) sessions and one or more identifiers of the user device that initiated the previous session. The authentication provider 7 may be implemented as a radius server that supports an authentication, authorization, and accounting (AAA) protocol. In some cases, the AP 3-1 may implement the authentication provider 7, and the example embodiment shown in FIG. 1 is not intended to be limiting.

In operation, the user device 2 may associate with an SSID of the AP 3-1. The SSID may be the same for each of AP 3-1 to 3-N, or may be different depending on a desired configuration. After association, the associated AP may then provide a DHCP address or otherwise provision the IP address of the user device 2. The user device 2 may then perform CNA detection by accessing a predefined URL. In response to detection of a captive portal, e.g., the user device 2 fails to receive a response 200, the user device 2 may present a feature-constrained CNA browser. The authentication provider 7 can generate a SUCCESS message and send the same to the user device 2 by way of the AP. The SUCCESS message can include a redirect URL to a captive portal address. The SUCCESS message may also be referred to herein as a CNA bypass message. In response to receiving the SUCCESS message, the feature-constrained CNA browser presented on the user device 2 can present a CONTINUE navigation element, e.g., a button, link or other element. A user may then select the CONTINUE navigation element, and in response, the CNA browser may then launch a full-featured browser using the redirect URL received in the SUCCESS message. In other cases, the feature-constrained CNA browser may automatically transition to the redirect URL via the full-featured browser without user input to select a CONTINUE navigation element.

Once the full-featured browser launches the redirect URL, the user may then satisfy one or more additional authentication requirements. Such requirements may include, for example, watching at least a portion of a video, scrolling through terms of service/license information, solving a puzzle/game, viewing a video/interactive advertisement, taking a survey, taking a quiz/test, or any combination thereof. After satisfying the additional authentication requirements, the user may be marked as authenticated in a database of the authentication provider 7. The authentication provider 7 may therefore maintain a session for the user that may expire after a predetermined amount of time. Prior to expiration of the session, the user may disassociate with a connected AP and re-associate with any one of the available APs without having to re-authenticate. This may be particularly advantageous for applications in public spaces or other locations that offer 'free' Wi-Fi. For example, an airport may include multiple terminals each having one or more of the APs 3-1 to 3-N to provide site-wide coverage. A user may therefore associate and authenticate with a single AP and then travel between coverage zones provided by the other APs without necessarily performing re-authorization.

Figure 2:
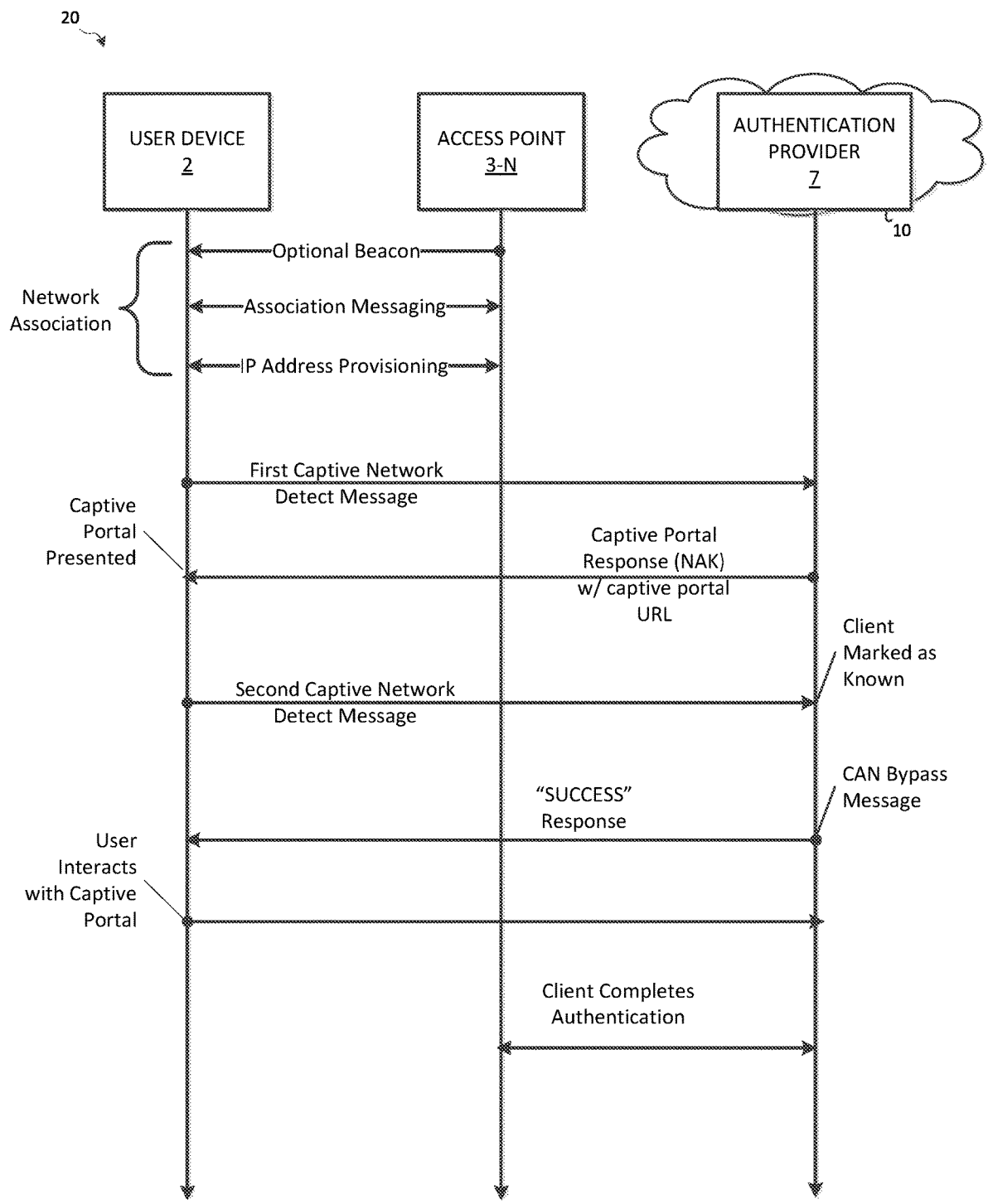
FIG. 2 is a sequence diagram showing one example authentication process suitable for use by the network authentication system of FIG. 1, in accordance with an embodiment of the present disclosure.

FIG. 2 is a sequence diagram showing one example of an authentication process 20 consistent with the present disclosure. The authentication process 20 may be performed by the controller 4 (FIG. 1) or any other suitable processing device. The particular sequence of messaging shown in FIG. 2 is not intended to be limiting and is instead intended to reflect one example scenario where a user device of a generic type, e.g., an iPhone, an Android, or other mobile computing device, associates and authenticates with an AP configured to perform methods consistent with aspects of the present disclosure.

The process 20 begins with the user device 2 associating with the AP 3-N using, for example, an IEE 802.11 association routine or other network association routine. This messaging may include, for instance, optional beaconing (e.g., to publish an SSID such as TREEWIFT), optional authentication (e.g., using a security key) and leasing a DHCP address.

In response to associating with the AP 3-N, the user device 2 detects if a captive portal is enabled by sending a first captive network detect message. The first captive network detect message may be provided to the authentication provider 7 by way of AP 3-N. As discussed above, the authentication provider 7 may utilize a AAA protocol, and the AP 3-N may forward the message via the authentication interface 6 (FIG. 1) to the authentication provider 7 using AAA. The captive network detect message may simply be a request to a predefined URL that would be accessible if the user device 2 has 'full' access to the Internet.

The authentication provider 7 may then receive the first captive network detect message and compare the originating identifier (e.g., the MAC of the user device 2) to a database of 'live' sessions. In the event a session for the user device 2 is active, the authentication provider 7 sends a captive portal response with an ACK (e.g., response code 200) to the user device 2. On the other hand, if no such session exists or is otherwise de-activated, the authentication provider 7 sends a captive portal response with a NAK (e.g., no response 200 code). This captive portal response can also include a captive portal URL to redirect the user device 2.

Figures 3A, 3B, 3C:
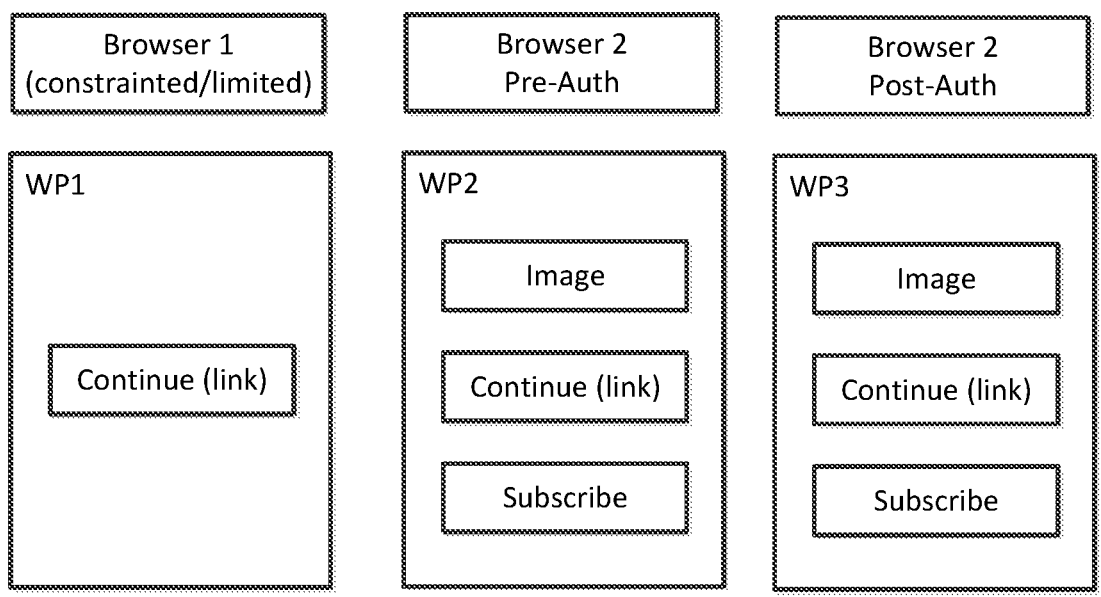
FIGS. 3A-3C diagrammatically illustrates the progression of browser pages associated with the authentication process of FIG. 2.

The user device 2 then receives the captive portal response from the authentication provider 7. In the event the captive portal response includes an ACK, the user device 2 proceeds to allow 'full' internet access by allowing a user to launch a full-featured browser to a URL of their choice. In contrast, the user device 2 can launch a CNA browser in response to the captive portal response including a NAK. One example of a CNA browser is shown in FIG. 3A. The CNA browser can utilize the captive portal URL within the captive portal response to request content to present in the CNA browser. The request may then be forwarded to the authentication provider 7. This request may thus be referred to as a second captive portal network detect message.

The authentication provider 7 may then provide a SUCCESS response message to the user device 2. In response, the user device 2 presents a CNA browser that includes a "continue" button or other navigational element. The SUCCESS response message may therefore be accurately referred to as a CNA bypass message as the effect on the CNA browser receiving the message is to 'bypass' the stage requiring compulsory user input from a user, e.g., a hotel room number, a phone number, a user name and password, and so on. Instead, the CNA browser presents a "continue" link or other navigation element. A user may then select the "continue" link, and in response thereto, the user device 2 may transition to a full-featured browser, e.g., Browser 2 as shown in FIG. 3B. In some instances, no further user interaction is necessary and the user device 2 may transition to a full-featured browser in response to receiving the CNA bypass message. Therefore, the CNA bypass message is sent by the controller without necessarily receiving an indication of user input being supplied in the CNA browser.

At this stage, the user may interact with the full-featured browser but the user device 2 remains unauthorized, e.g., unable to 'fully' access the Internet or content beyond the captive portal. The full-featured browser may present content that allows the user to interact with the captive portal and satisfy one or more predefined requirements in order to complete authorization. The presented content may include at least one of an image, a video, interactive user controls (e.g., scrolling text boxes, and so on), a quiz, a survey, a game, a puzzle, or any combination thereof. In some cases, the user may be required to watch at least a portion of a video before being authenticated. After authenticating, the user may then select a "continue" element or other navigation feature to advance to a landing page or other predefined URL. In some cases the full-feature browser automatically navigates to the landing page/predefined URL, e.g., after the video plays or other event occurs, without necessarily receiving user input.

After satisfying the one or more requirements, the user device 2 can send a message to the authentication provider 7. In response, the authentication provider 7 may then establish a session for the user device 2 by generating or otherwise adjusting an associated entry in a database or memory. The entry may include at least an identifier of the user device 2, e.g., a MAC address, and optionally an expiration time for the session. After authentication, the user device 2 may then be redirected to a landing page (e.g., based on a redirect message from the authentication provider), at which time the user device 2 will be considered 'authenticated' and allowed to browse content beyond the portal such as the Internet or a restricted list of websites available on the LAN/WAN.

FIG. 3 diagrammatically illustrates the progression of browser pages associated with the authentication process of FIG. 2. In one embodiment, Browser 1 has a limited/constrained functionality and is of the type typically used on mobile devices such as smart phones (e.g. does not handle cookies and does not have session identifiers), and Browser 2 is a full-featured browser having full functionality (e.g. handles cookies, tabs, multi-media content, and has session identifiers).

In accordance with an aspect of the present disclosure a method of providing a captive portal authentication scheme on a computer network is disclosed. The method comprising receiving, by a controller, a first captive portal detect message from a user device and sending a message with an identifier of a captive portal location to the user device, receiving, by the controller, a second captive portal detect message from the user device and sending a captive network assistant (CNA) bypass message to the user device, the CNA bypass message to cause the user device to transition a CNA feature-constrained browser from an unauthenticated mode to an authenticated mode, and wherein the authenticated mode allows the user device to transition from the CNA feature-constrained browser to a full-featured browser to complete authentication with an authentication provider associated with the network, and receiving, by the controller, a message from the user device indicating one or more authentication requirements were satisfied via the full-featured browser, and in response to the receiving the message, completing authentication of the user device via the authentication provider to allow the user device to access content via the network beyond the captive portal.

In accordance with another aspect of the present disclosure a network authentication system is disclosed. The network authentication system comprising a gateway device, the gateway device having a controller and a network interface circuit coupled to the controller to initiate a network authentication process with an associated user device, the network authentication process including the gateway device sending a captive network assistant (CNA) bypass message to the associated user device, the CNA bypass message to cause the user device to transition a CNA feature-constrained browser from an unauthenticated mode to an authenticated mode, and wherein the authenticated mode allows the user device to transition from the CNA feature-constrained browser to a full-featured browser to complete authentication.

In accordance with another aspect of the present disclosure a non-transitory computer-readable medium having a plurality of instructions encoded thereon that when executed by at least one processor cause a process to be performed is disclosed. The process configured to receive a captive portal detect message from a user device, and in response to receiving the captive portal detect message sending a CNA bypass message to the user device, the CNA bypass message to cause the user device to transition a CNA feature-constrained browser from an unauthenticated mode to an authenticated mode, and wherein the authenticated mode allows the user device to transition from the CNA feature-constrained browser to a full-featured browser to complete authentication with an authentication provider.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. As used herein, use of the term "nominal" or "nominally" when referring to an amount means a designated or theoretical amount that may vary from the actual amount.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, a transmitter and/or receiver circuit of antenna device 8 may include a storage medium (not shown) to store instructions (in, for example, firmware or software) to perform the operations described herein. The storage medium may include any type of non-transitory tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Any block diagrams herein represent conceptual views of illustrative circuitry embodying the principles of the disclosure. Similarly, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

As used in any embodiment herein, "circuit" or "circuitry" may comprise, for example, singly or in any combination, hardwired circuitry, programmable circuitry, state machine circuitry, and/or firmware that stores instructions executed by programmable circuitry. In at least one embodiment, the transmitter and receiver may comprise one or more integrated circuits. An "integrated circuit" may be a digital, analog or mixed-signal semiconductor device and/or microelectronic device, such as, for example, but not limited to, a semiconductor integrated circuit chip. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. As used herein, use of the term "nominal" or "nominally" when referring to an amount means a designated or theoretical amount that may vary from the actual amount.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A method of providing a captive portal authentication scheme on a computer network, the method comprising:

receiving, by a controller, a first captive portal detect message from a user device and sending a message with an identifier of a captive portal location to the user device;

receiving, by the controller, a second captive portal detect message from the user device and sending a captive network assistant (CNA) bypass message to the user device, the CNA bypass message to cause the user device to transition a CNA feature-constrained browser to a full-featured browser to complete authentication with an authentication provider associated with the network, and wherein the CNA bypass message is sent by the controller without receiving an indication of user input being supplied in the CNA feature-constrained browser; and receiving, by the controller, a message from the user device indicating one or more authentication requirements were satisfied via the full-featured browser, and in response to the receiving the message, completing authentication of the user device via the authentication provider to allow the user device to access content via the network beyond the captive portal.

2. The method of claim 1, wherein the CNA feature-constrained browser has limited capabilities relative to the full-featured browser.

3. The method of claim 1, wherein the one or more authentication requirements include at least one of watching at least a portion of a video, playing a game, solving a puzzle, and/or providing identifying information.

4. The method of claim 1, wherein the CNA feature-constrained browser is implemented at an operating system (OS)-level.

5. The method of claim 1, wherein the CNA bypass message includes a redirect uniform resource locater (URL).

6. The method of claim 1, wherein the computer network is a Wi-Fi network, and wherein the controller is implemented in an access point or a gateway device associated with the Wi-Fi network.

7. The method of claim 1, wherein the authentication provider is implemented by the controller.

8. The method of claim 1, wherein the authentication provider is implemented by a remote computing device.

9. The method of claim 1, wherein the authentication provider is implemented as a Radius server that supports an authentication, authorization, and accounting (AAA) protocol.

10. A network authentication system, the network authentication system comprising:

a gateway device, the gateway device having a controller and a network interface circuit coupled to the controller to initiate a network authentication process with an associated user device, the network authentication process including the gateway device sending a captive network assistant (CNA) bypass message to the associated user device, the CNA bypass message to cause the user device to transition a CNA feature-constrained browser to transition from the CNA feature-constrained browser to a full-featured browser to complete authentication, wherein the CNA bypass message is sent by the controller of the gateway without receiving a message that indicates user input was supplied in the CNA feature-constrained browser.

11. The network authentication system of claim 10, further comprising an authentication provider, the authentication provider being implemented as a Radius server that utilizes an authentication, authorization, and accounting (AAA) protocol, and wherein authentication by the full-featured browser includes communicating with the authentication provider.

12. The network authentication system of claim 10, wherein authentication by the full-featured browser includes satisfying one or more authentication requirements, the one or more authentication requirements including at least one of watching at least a portion of a video, playing a game, solving a puzzle, and/or providing identifying information.

13. The network authentication system of claim 10, wherein the gateway device includes access point functionality, and wherein the gateway device allows for user devices to associate via Wi-Fi.

14. A non-transitory computer-readable medium having a plurality of instructions encoded thereon that when executed by at least one processor cause a process to be performed, the process configured to:
   receive a captive portal detect message from a user device; and
   in response to receiving the captive portal detect message sending a CNA bypass message to the user device, the CNA bypass message to cause the user device to transition a CNA feature-constrained browser to a full-featured browser to complete authentication with an authentication provider,
   wherein the CNA bypass message is sent without receiving a message that indicates user input was supplied in the CNA feature-constrained browser.

* * * * *